(12) United States Patent
Iwazaki

(10) Patent No.: US 6,909,562 B2
(45) Date of Patent: Jun. 21, 2005

(54) CONTROL APPARATUS FOR MAGNETIC READ

(75) Inventor: Fumiharu Iwazaki, Shizuoka-ken (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 461 days.

(21) Appl. No.: 09/951,881

(22) Filed: Sep. 13, 2001

(65) Prior Publication Data

US 2003/0048555 A1 Mar. 13, 2003

(51) Int. Cl.[7] .................. G11B 25/04; G11B 19/247
(52) U.S. Cl. ........................................................ 360/2
(58) Field of Search ............................. 360/2; 235/449; G11B 19/247

(56) References Cited

U.S. PATENT DOCUMENTS 6,561,419 B1 * 5/2003 Koizumi et al. .............. 360/51

2001/0025885 A1 * 10/2001 Kuroiwa et al. ............. 235/449

FOREIGN PATENT DOCUMENTS

JP            01227266 A  *  9/1989  ......... G11B/19/247

* cited by examiner

Primary Examiner—David Hudspeth
Assistant Examiner—Rocio Colon
(74) Attorney, Agent, or Firm—Frishauf, Holtz, Goodman & Chick, P.C.

(57) ABSTRACT

A magnetic read control apparatus magnetically reads information stored in a magnetic stripe of a medium by varying a relative carrying velocity between a velocity at which the magnetic head is carried in a predetermined direction and a velocity at which the medium is carried when a read error occurs in the information stored in the magnetic stripe of the medium.

9 Claims, 6 Drawing Sheets

CONTROL APPARATUS FOR MAGNETIC READ

BACKGROUND OF THE INVENTION

1. Field of the Invention

The present invention relates to a magnetic read control apparatus for magnetically reading information stored in a magnetic stripe of a medium.

2. Description of the Related Art

A magnetic read control apparatus for reading information stored in a medium such as an inserted magnetic card by a magnetic head is known. The magnetic read will be described with reference to FIG. 9. A control section of the magnetic read control apparatus moves a magnetic head 2 at a constant velocity along a magnetic stripe 1a of a magnetic card 1. An amplifier 3 receives information that is magnetically read by the magnetic head 2. The amplifier 3 transmits the information to a binary circuit 4. The binary circuit 4 binarizes the information and supplies it to a demodulation circuit 5. The demodulation circuit 5 demodulates the binarized information and supplies it to the control section as read data.

If a read error occurs, then the magnetic read control apparatus performs the magnetic read a plurality of times to read information from the magnetic card 1. The magnetic control apparatus can read an error, which has occurred accidentally in the process of magnetic read, with high probability by repeating the magnetic read operation. If, however, the read error results from an essential cause such as degradation of magnetic characteristics of the magnetic stripe and that of a machine, the apparatus can read the error only with low probability even though it repeats the magnetic read.

BRIEF SUMMARY OF THE INVENTION

An object of the invention is to provide a magnetic read control apparatus capable of performing a magnetic read with high probability.

According to one embodiment of the present invention, a magnetic read control apparatus comprises a medium carrying section configured to carry an inserted medium having a magnetic stripe, a magnetic head carrying section configured to carry a magnetic head in a predetermined direction, a reading section configured to read information stored in the magnetic stripe by the magnetic head, and a control section configured to control the reading section so as to read the information stored in the magnetic stripe by varying a relative carrying velocity between a velocity at which the medium carrying section carries the medium and a velocity at which the magnetic head carrying section carries the magnetic head when a read error occurs in the reading section.

According to another embodiment of the present invention, a magnetic read control apparatus comprises a medium carrying section configured to carry an inserted medium having a magnetic stripe, a magnetic head carrying section configured to carry a magnetic head in a predetermined direction, a reading section configured to read information stored in the magnetic stripe by the magnetic head, and a control section configured to control the reading section so as to read the information stored in the magnetic stripe without varying a relative carrying velocity between a carrying velocity of the medium by the medium carrying section and a carrying velocity of the magnetic head by the magnetic head carrying section at least one time when a read error occurs in the reading section and then read the information stored in the magnetic stripe by varying the relative carrying velocity when a read error occurs again in the reading section.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and comprise a part of the specification, illustrate presently embodiments of the invention, and together with the general description given above and the detailed description of the embodiments given below, serve to explain the principles of the invention.

DETAILED DESCRIPTION OF THE INVENTION

Hereinafter, embodiments of the present invention will be described with reference to the drawings.

(First Embodiment)

Figure 1:
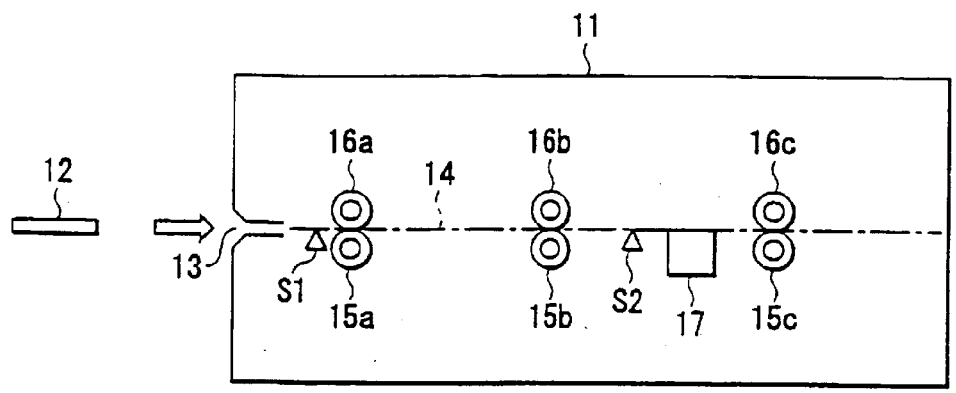
FIG. 1 is a view showing a section of a magnetic read control apparatus according to a first embodiment of the present invention.

FIG. 1 is a view showing a section of a magnetic read control apparatus according to the present embodiment.

A magnetic read control apparatus 11 includes an inlet port 13 for inserting a magnetic card 12 having a magnetic stripe 12a on its back. The apparatus also includes a carrying path 14 for carrying the magnetic card 12 from the inlet port 13 to the innermost.

Carrying rollers 15a, 15b and 15c are provided under the carrying path 14 at regular intervals from the inlet port 13. Driven rollers 16a, 16b and 16c are provided above the carrying path 14 from the inlet port 13 and opposite to their respective carrying rollers 15a, 15b and 15c. The magnetic read control apparatus 11 carries the magnetic card 12 from the upstream side to the downstream side by forward rotation of the carrying rollers 15a, 15b and 15c. The magnetic read control apparatus 11 carries the magnetic card 12 from the downstream side to the upstream side by reverse rotation of the carrying rollers 15a, 15b and 15c.

A magnetic head section 17 for performing a magnetic read is provided between the carrying rollers 15b and 15c and under the carrying path 14.

A sensor S1 for sensing the magnetic card 12 inserted from the inlet port 13 is provided on the upstream side of the carrying roller 15a. A sensor 52 for sensing a position of the magnetic card 12 to read information stored in the magnetic stripe 12a of the magnetic card 12 is provided on the upstream side of carrying roller 15c.

These sensors S1 and S2 each include, e.g., an optical sensor in which light-emitting and light-receiving sections are arranged so as to vertically interpose the carrying path 14 therebetween.

A process that is executed by a control section of the magnetic read control apparatus 11 when the magnetic card 12 is inserted into the inlet port 13 will now be described.

The control section of the magnetic read control apparatus 11 detects the insertion of the magnetic card 12 through the sensor S1. Thus, the control section rotates the carrying rollers 15a, 15b and 15c forward to carry the magnetic card 12 downstream.

When the sensor S2 senses the magnetic card 12, the control section carries the magnetic card 12 for a predetermined distance and then stops. The control section controls the magnetic head section 17 to magnetically read information stored in the magnetic stripe 12a. After the magnetic read is completed, the control section rotates the carrying rollers 15a, 15b and 15c reversely to carry the magnetic card 12 upstream and eject the card 12 from the inlet port 13.

Figure 2:
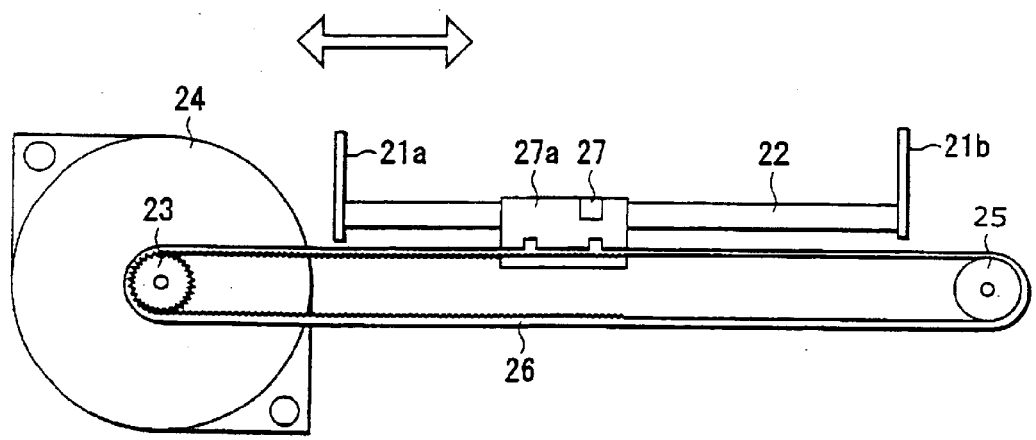
FIG. 2 is a view showing a structure of a magnetic head section according to the first embodiment.

FIG. 2 is a view showing a structure of the magnetic head section 17.

The magnetic card 12 inserted from the inlet port 13 is carried above the magnetic head section 17 in the directions indicated by arrows in the figure. Frames 21a and 21b stand from side to side so as to cross the carrying directions of the magnetic card 12 at right angles. A shaft 22 is provided between the frames 21a and 21b in parallel with the carrying directions of the magnetic card 12.

A pulse motor 24 having a toothed motor shaft 23 that rotates forward and backward by application of a pulse voltage is arranged outside the frame 21a. A rotatable driven pulley 25 is arranged outside the frame 21b and opposite to the pulse motor 24.

An endless toothed belt 26 having teeth inside extends between the driven pulley 25 and the toothed motor shaft 23. The teeth of the toothed motor shaft 23 and the teeth provided inside the toothed belt 26 are engaged with each other. A carrier 27a with a magnetic head 27 is attached to the toothed belt 26.

In the magnetic head section 17, when the pulse motor 24 rotates, the toothed motor shaft 23 rotates in synchronization with the pulse motor 24. The toothed belt 26 is rotated by the rotation of the toothed motor shaft 23. Then, the carrier 27a attached to the toothed belt 26 moves along the shaft 22 between the frames 21a and 21b.

Figure 3:
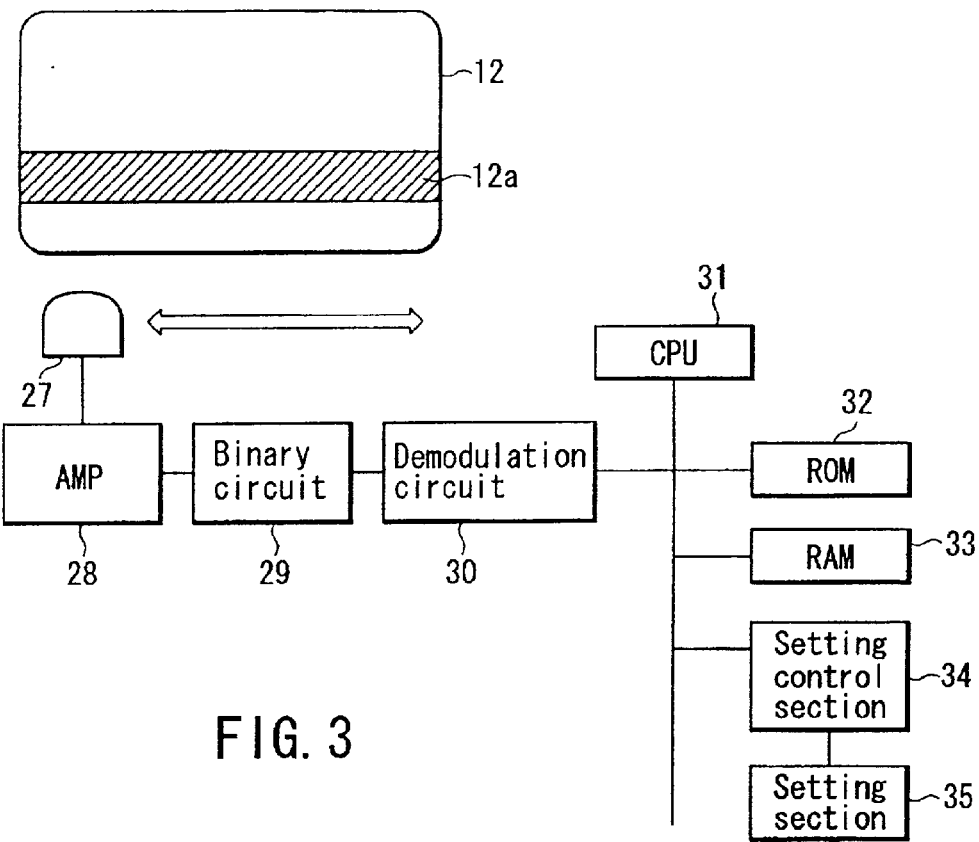
FIG. 3 is a view showing a circuit arrangement for performing a magnetic read according to the first embodiment.

FIG. 3 is a view showing a circuit arrangement for reading information from the magnetic stripe 12a of the magnetic card 12.

The magnetic stripe 12a is formed on the magnetic card 12, and information is stored in the magnetic stripe 12a. The magnetic head 27 reads a signal from the magnetic stripe 12a and transmits it to an amplifier (AMP) 28. The amplifier 28 amplifies the signal received from the magnetic head 27 and transmits it to a binary circuit 29. The binary circuit 29 binarizes the signal received from the amplifier 28 and supplies it to a demodulation circuit 30. The demodulation circuit 30 demodulates the received signal and sends it to a CPU 31 of a main body of the control section as read data.

If the magnetic head 27 reads information stored in the magnetic stripe 12a more and more at high velocity, the amplifier 28 can reproduce a waveform of the read information at a high level.

The control section includes a CPU 31, a ROM 32 and a RAM 33. The ROM 32 stores various programs that are to be executed by the CPU 31. The RAM 33 has a work area, an area for storing the set number of repetitions of a magnetic read, and an area for storing a variable $\alpha$ such as 1.1, 0.9, 1.2, and 0.8 that are set in correspondence with the number of retries in order to vary the carrying velocity of 10 inch/sec of the magnetic head 27.

The CPU 31 detects an operator's setting of a setting section 35 through a setting control section 34.

Figure 4:
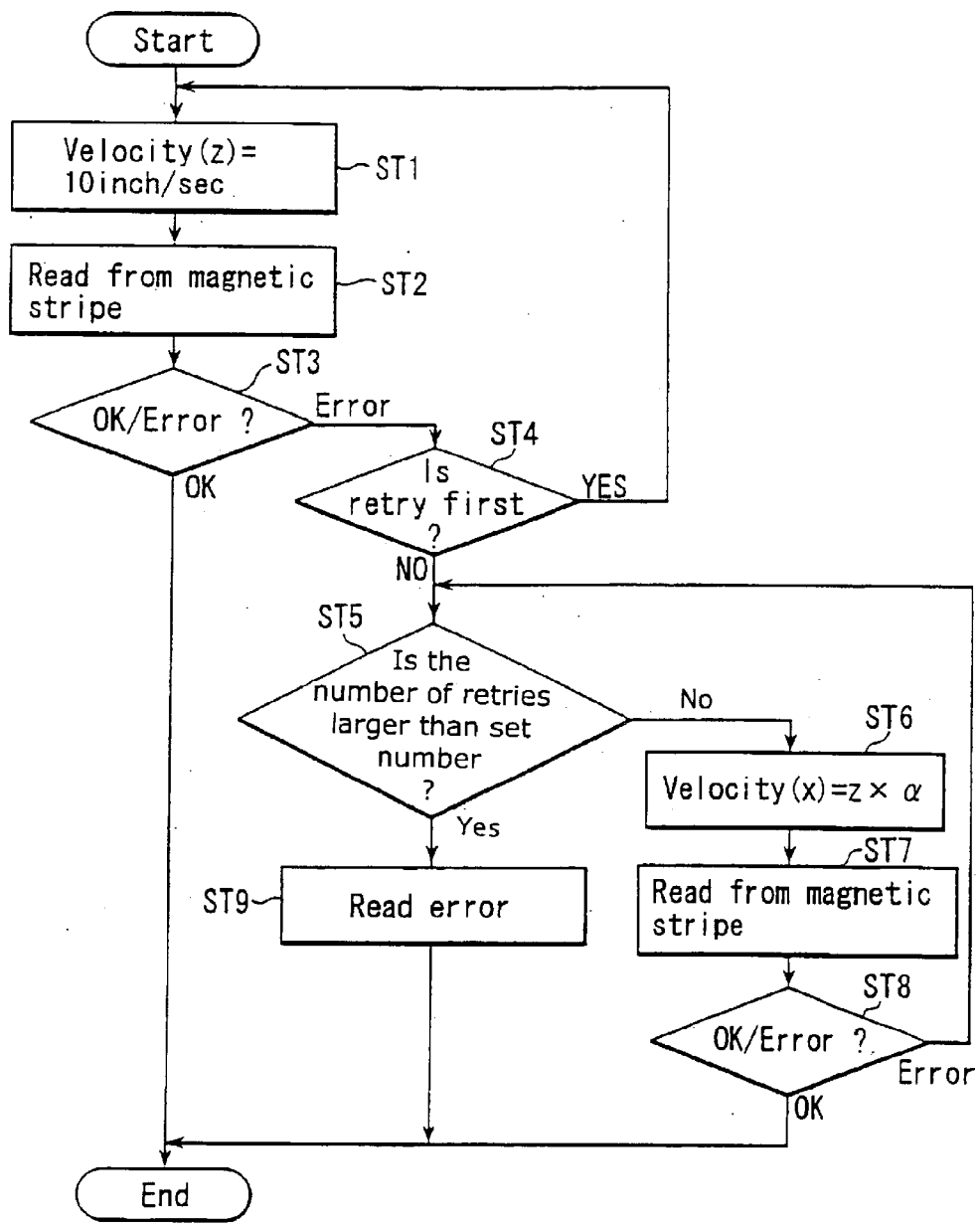
FIG. 4 is a flowchart showing a process to be executed by a control section according to the first embodiment.

FIG. 4 is a flowchart showing a process to be executed by the CPU 31. The process starts when the magnetic stripe 12a of the magnetic card 12 is located in a magnetic read position of the magnetic head section 17.

In step ST1, the CPU 31 carries the magnetic head 27 at a velocity of 10 inch/sec along the shaft 22. In step ST2, the magnetic head 27 magnetically reads information stored in the magnetic stripe 12a. In step ST3, the CPU 31 determines whether a read error occurs from the data received through the amplifier 28, the binary circuit 29, and the demodulation circuit 30.

If the CPU 31 determines that the read error has occurred in step ST3, it determines whether the read error is the first or not in step ST4. If the CPU 31 determines that the read error is the first, it returns to step ST1 and repeats the process of the above steps ST1 to ST3.

If the CPU 31 determines that the read error is the second or more in step ST4, it determines whether the number of retries is larger than a set-number in step ST5. If the CPU 31 determines that the number of retries is smaller than the set number, it calculates a carrying velocity of 11 inch/sec by multiplying the carrying velocity of 10 inch/sec by variable $\alpha$ (=1.1) in step ST6. In step ST7, the CPU 31 moves the magnetic head 27 at a velocity of 11 inch/sec along the shaft 22 to perform a magnetic read.

In step ST8, the CPU 31 determines whether a read error has occurred. If it determines that the read error has occurred, it returns to step ST5 to determine whether the number of retries is larger than the set number. If the CPU 31 determines that the number of retries is smaller than the set number, it calculates a carrying velocity of 9 inch/sec by multiplying the carrying velocity of 10 inch/sec of the magnetic head 27 by variable $\alpha$ (=0.9) in step ST6. In step ST7, the magnetic head 27 is moved at a velocity of 9 inch/sec along the shaft 22 to perform a magnetic read.

As described above, in steps ST5 to ST8, the magnetic head 27 is carried at a carrying velocity calculated by multiplying the carrying velocity of 10 inch/sec of the magnetic head 27 by variable $\alpha$ (1.1, 0.9, 1.2, 0.8,. . . ).

If the CPU 31 determines that the number of retries exceeds the set number in step ST5, it determines that a read error has occurred and handles the read error in step ST9.

When the CPU 31 determines that the information stored in the magnetic stripe 12a can be read in steps ST3 and ST8 or when it determines that a read error has occurred and handles the read error in step ST9, the process ends.

According to the first embodiment, when a retry of magnetic read is performed, the magnetic head 27 is carried at a carrying velocity obtained by multiplying the carrying velocity of 10 inch/sec of the magnetic head 27 by variable α. It is thus possible to vary the capability by which the magnetic head 27 reads information stored in the magnetic stripe 12a.

In other words, even though a read error results from an essential cause such as degradation of magnetic characteristics of the magnetic stripe 12a, the frequency of occurrences of read errors can greatly be reduced.

Even though the CPU 31 detects a read error, it makes one magnetic read without varying the carrying velocity of the magnetic head 27. A read error that has occurred accidentally can thus be corrected at this time.

In the first embodiment, in order to vary the carrying velocity of the magnetic head 27, the variable α is set as 1.1, 0.9, 1.2, 0.8, . . . , such that the velocity higher than 10 inch/sec and the velocity lower than 10 inch/sec alternate with each other. However, the variable α can be set as 1.1, 1.2, . . . , 0.9, 0.8, . . . , such that a read is performed at a velocity higher than a given velocity of 10 inch/sec and then at a velocity lower than the given velocity.

By setting the variable α as described above, the magnetic read control apparatus 11 can enhance the capability of a magnetic read and perform the magnetic read. When the magnetic characteristics of the magnetic stripe 12a of the magnetic card 12 are degraded, the process velocity of the magnetic read can be improved.

(Second Embodiment)

A second embodiment will now be described. The same components as those of the foregoing embodiment are denoted by the same reference numerals and their detailed descriptions are omitted.

Figure 5:
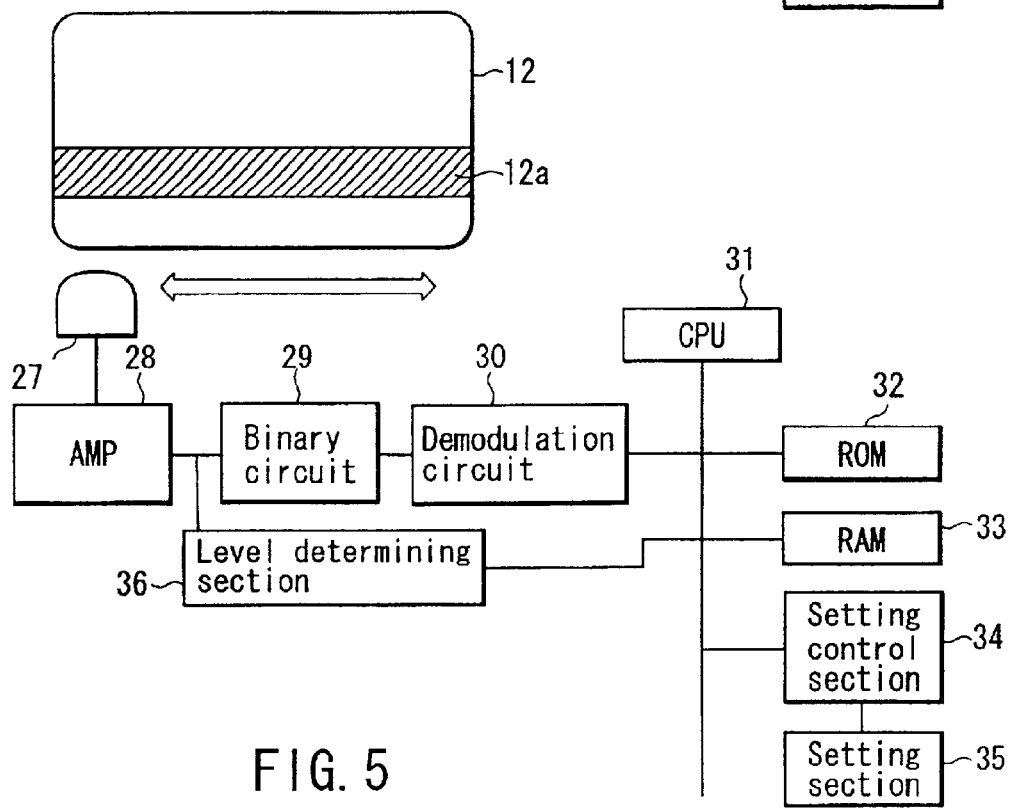
FIG. 5 is a diagram showing a circuit arrangement for performing a magnetic read according to a second embodiment of the present invention.

A circuit for a magnetic read is arranged by adding a level determination section 36 to the circuit arrangement according to the first embodiment, as shown in FIG. 5. The level determination section 36 receives a waveform from the amplifier 28, reproduces the received waveform, and supplies the CPU 31 with level data indicating whether or not the level of the reproduced waveform is higher than a set reference value.

The RAM 33 stores variables β and γ for varying the carrying velocity of 10 inch/sec at which the set magnetic head 27 is carried along the shaft 22. The variables β and γ correspond to the number of retries and are stored in the RAM 33 as 1.1, 1.2, 1.3, . . . , 0.9, 0.8, 0.7, . . . and 0.9, 0.8, 0.7, . . . , 1.1, 1.2, 1.3, . . . , respectively.

Figure 6:
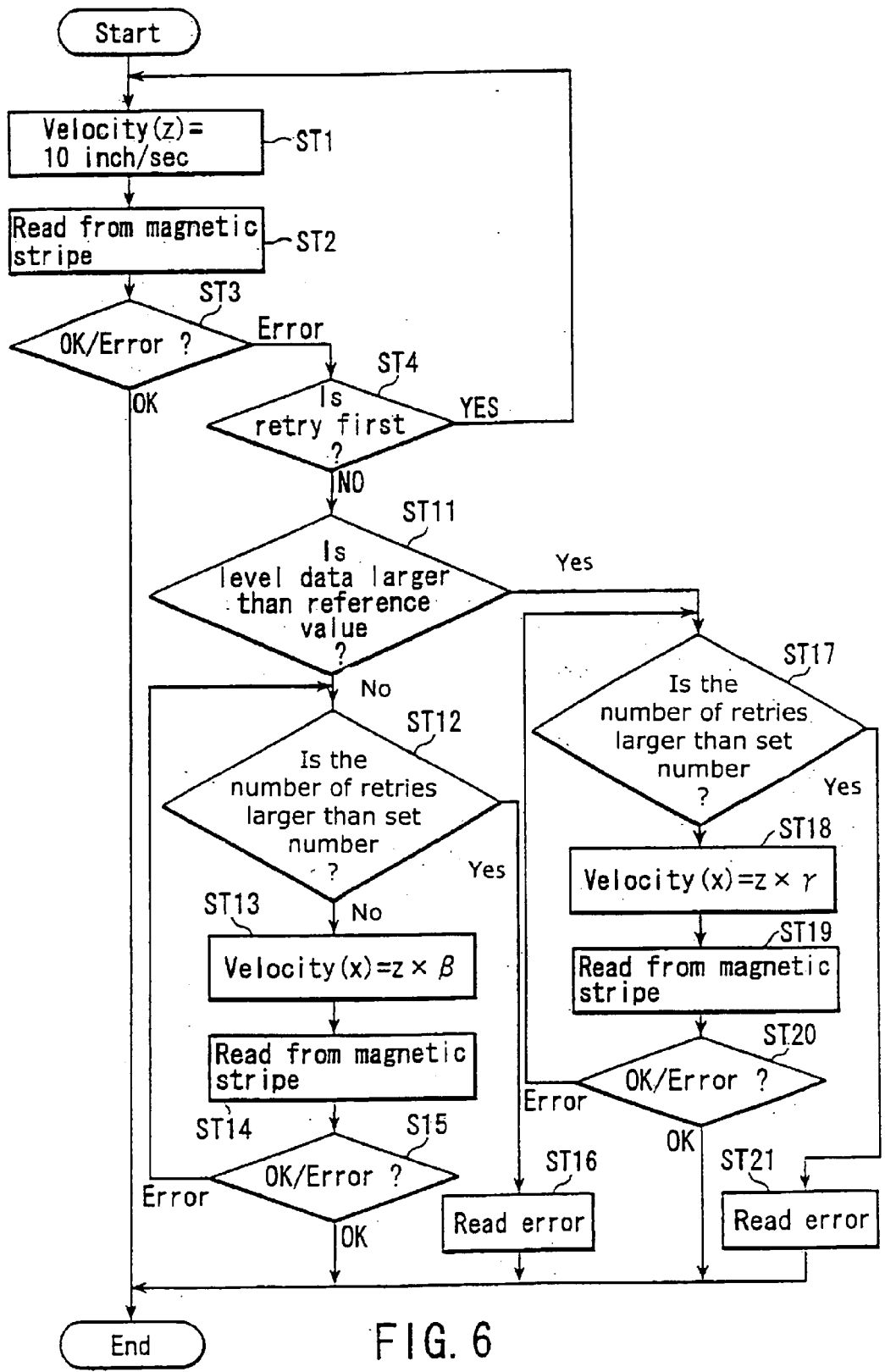
FIG. 6 is a flowchart showing a process to be executed by a control section according to the second embodiment.

The foregoing steps ST5 to ST9 of the process executed by the CPU 31 are replaced with steps ST11 to ST21, which will be described with reference to FIG. 6.

If the CPU 31 determines that the number of retries is two or more in step ST4, it determines whether the level data output from the level determination section 36 is larger than the set reference value in step ST 11.

If the CPU 31 determines that the level data is smaller than the reference value, it determines whether or not the number of retries is larger than the set number in step ST12. When the CPU 31 determines that the number of retries is smaller than the set number, it multiplies the carrying velocity of 10 inch/sec by variable β of 1.1 to obtain the carrying velocity of 11 inch/sec in step ST13. In step ST14, the magnetic head 27 reads information stored in the magnetic stripe 12a at a carrying velocity of 11 inch/sec.

Then, the CPU 31 determines whether or not the information is read normally in step ST15. If the CPU 31 determines that a read error occurs, it returns to step ST12 to determine whether the number of retries is larger than the set number. When the CPU 31 determines that the number of retries is smaller than the set number, the magnetic read is performed again under condition that variable β is equal to 1.2 and the carrying velocity of the magnetic head 27 is 12 inch/sec.

The CPU 31 thus sets variable β as 1.1, 1.2, 1.3, . . . , 0.9, 0.8, 0.7, . . . to increase the carrying velocity of the magnetic head 27 and then decrease it whenever a read error is detected.

If the CPU 31 determines that the magnetic read is completed in step ST15, it ends the process. If the CPU 31 determines that the number of retries is larger than the set number in step ST12, it detects a read error in step ST16 and ends the process.

If the CPU 31 determines that the level data is larger than the reference value in step ST11, it determines whether or not the number of retries is larger than the set number in step ST17. If the CPU 31 determines that the number of retries is smaller than the set number, it multiplies the carrying velocity of 10 inch/sec by variable γ of 0.9 to obtain the carrying velocity of 9 inch/sec in step ST8. In step ST19, the magnetic head 27 performs a magnetic read at a carrying velocity of 9 inch/sec.

Then, the CPU 31 determines whether or not the information is read normally in step ST20. If the CPU 31 determines that a read error occurs, it returns to step ST17 to determine whether the number of retries is larger than the set number. When the CPU 31 determines that the number of retries is smaller than the set number, the magnetic read is performed again under condition that variable γ is equal to 0.8 and the carrying velocity of the magnetic head 27 is 8 inch/sec in step ST19.

The CPU 31 thus sets variable γ as 0.9, 0.8, 0.7, . . . 1.1, 1.2, 1.3, . . . to decrease the carrying velocity of the magnetic head 27 and then increase it whenever a read error is detected.

If the CPU 31 determines that the magnetic read is completed in step ST20, it ends the process. If the CPU 31 determines that the number of retries is larger than the set number in step ST17, it detects a read error in step ST21 and ends the process.

According to the second embodiment, the CPU 31 moves the magnetic head 27 at high velocity and then at low velocity when the level data received from the level determination section 36 is smaller than the reference value. On the other hand, the CPU 31 moves the magnetic head 27 at low velocity and then at high velocity when the level data received from the level determination section 36 is higher than the reference value.

Consequently, when a read error is detected, the magnetic head 27 can perform a magnetic read at a carrying velocity suitable for doing the magnetic read in accordance with magnetic characteristics of the magnetic stripe 12a of the magnetic card 12. The process velocity of the magnetic read can thus be improved.

(Third Embodiment)

A third embodiment will now be described. The same components as those of the foregoing embodiments are denoted by the same reference numerals and their detailed descriptions are omitted.

The CPU 31 performs a process described below in addition to the process of the first and second embodiments.

The CPU 31 starts a process when the carrying velocity of the magnetic head 27 varies in step ST6 of the first embodiment or when the carrying velocity of the magnetic head 27 varies in steps ST13 and ST18 of the second embodiment.

Figure 7A:
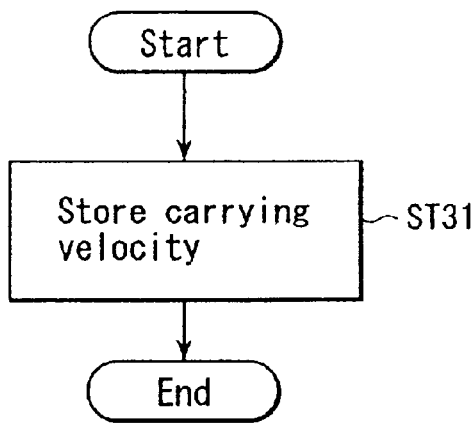
FIG. 7A is a flowchart showing a process to be executed by a control section according to a third embodiment of the present invention.

As shown in FIG. 7A, in step ST31, whenever the carrying velocity of the magnetic head 27 varies, the CPU 31 stores the varied carrying velocity in a given area of the RAM 33 and ends the process.

Then, the CPU 31 moves the magnetic head 27 and performs a magnetic read in steps ST7, ST14 and ST19.

The CPU 31 starts a process when it determines that the information stored in the magnetic stripe 12a can be read in step ST8 of the first embodiment or when it determines that the information can be read in steps ST16 and ST21 of the second embodiment.

Figure 7B:
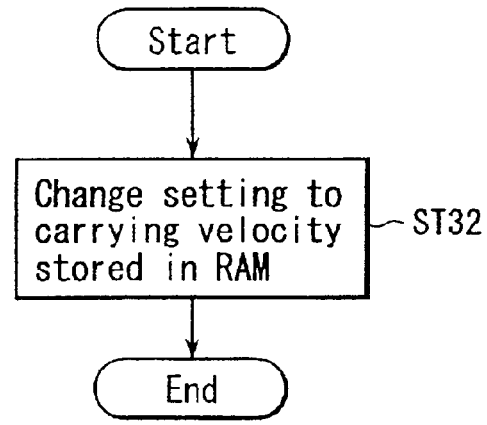
FIG. 7B is a flowchart showing another process to be executed by the control section according to the third embodiment of the present invention.
Figure 9:
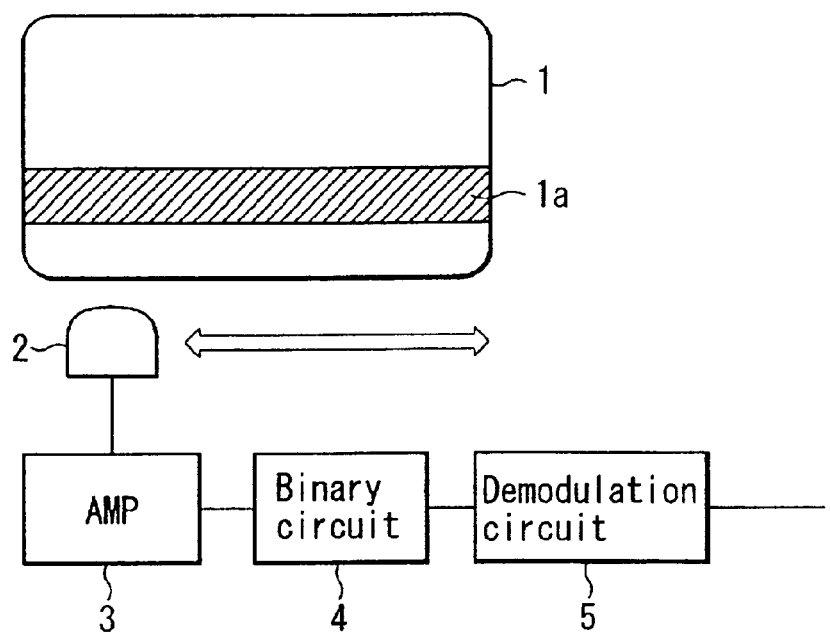
FIG. 9 is a view showing a circuit arrangement for performing a magnetic read of a prior art magnetic read control apparatus.

As illustrated in FIG. 7B, in step ST32, the CPU 31 changes the carrying velocity of the magnetic head 27 stored in the given area of the RAM 33 to that of 10 inch/sec.

If the process of step ST32 is completed, the CPU 31 ends the process described with reference to FIG. 4 or FIG. 6.

Consequently, when the magnetic read control apparatus 11 reads information stored in the magnetic stripe 12a of the magnetic card 12 to be inserted next, it can have a learning function of magnetic read with the newly set carrying velocity of the magnetic head 27 as an initial velocity. In other words, when the level at which the information is read magnetically becomes low, the magnetic head 27 can be set to start the magnetic read at a carrying velocity higher than 10 inch/sec from the beginning; therefore, it can read the information at a high level from the beginning.

According to the third embodiment, the occurrence of read errors resulting from an essential cause in which the level at which information is magnetically read from the magnetic stripe 12a is decreased due to deterioration of the machine, etc. can greatly be reduced by the learning function.

(Fourth Embodiment)

A fourth embodiment will now be described. The same components as those of the foregoing embodiments are denoted by the same reference numerals and their detailed descriptions are omitted.

In the first to third embodiments, the setting section 35 of the magnetic read control apparatus 11 includes a read-velocity changing switch for changing a setting by input using a switch or the like and for causing a shift to a read-velocity changing mode.

Figure 8:
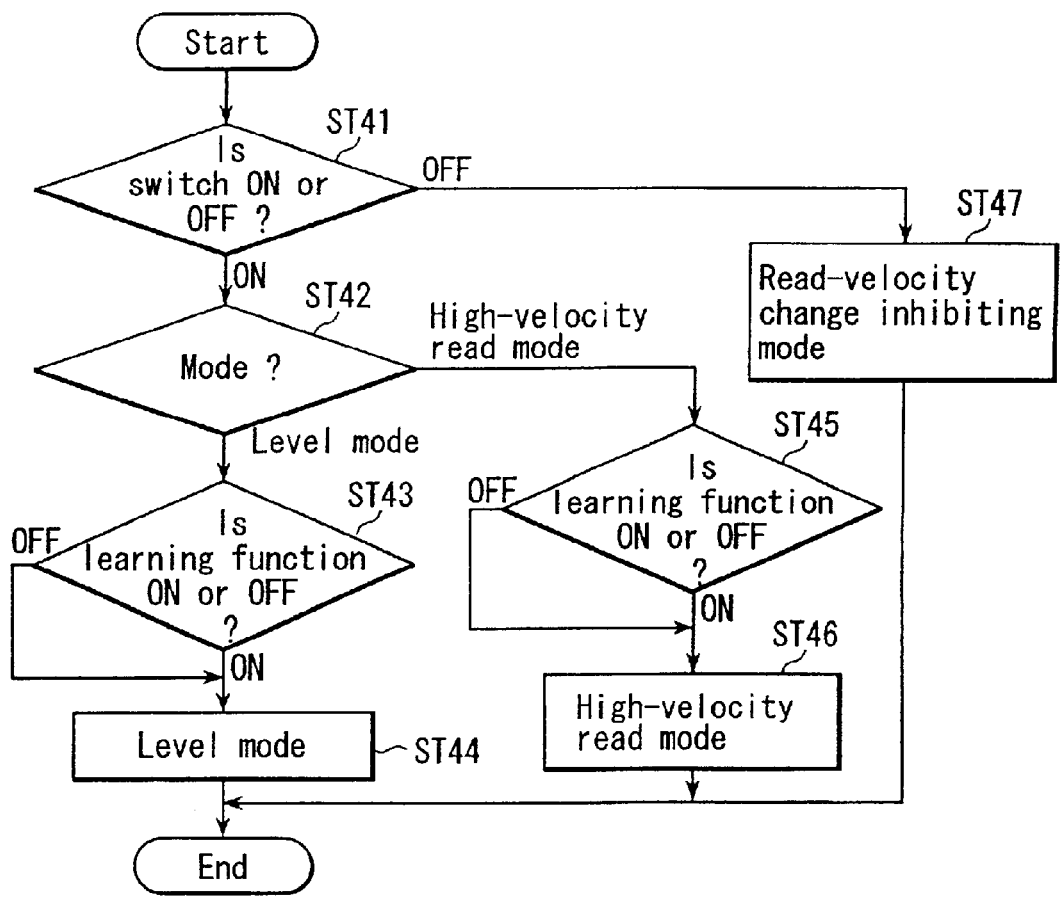
FIG. 8 is a flowchart showing a process to be executed by a control section according to a fourth embodiment of the present invention.

When the sensor S1 senses the insertion of the magnetic card 12, the CPU 31 detects an input state of the read-velocity changing switch and performs the process shown in FIG. 8.

In step ST41, the CPU 31 determines whether the read-velocity changing switch turns on or turns off. If the CPU 31 determines that the switch turns on or the mode is placed in the read-velocity changing mode, it determines whether the mode is a high-velocity read mode or a level mode in step ST42. The high-velocity read mode is a mode in which the magnetic head 27 moves at high velocity. The level mode is a mode in which the magnetic head 27 is carried based on the determination of the level determination section 36.

If the CPU 31 determines that the mode is placed in the level mode in step ST42, then it determines whether a learning function of storing a carrying velocity is on or off in step ST43. If the CPU 31 determines that the learning function is on, the level mode is set in a level mode with the learning function in step ST44. If the CPU 31 determines that the learning function is off, the level mode is set in a level mode without the learning function in step ST44.

On the other hand, if the CPU 31 determines that the mode is placed in the high-velocity read mode in step ST42, then it determines whether a learning function of storing a carrying velocity is on or off in step ST45. If the CPU 31 determines that the learning function is on, the high-velocity read mode is set in a high-velocity read mode with the learning function in step ST46. If the CPU 31 determines that the learning function is off, the high-velocity read mode is set in a high-velocity read mode without the learning function in step ST46.

If the CPU 31 determines that a read velocity switch turns off in step ST41, the mode is placed in a read-velocity change inhibiting mode in step ST47, with the result that the carrying velocity of the magnetic head 27 cannot be changed and the process ends.

According to the fourth embodiment, a setting for performing a magnetic read can freely be selected by an operator's optional setting.

In the foregoing first to fourth embodiments, when the CPU 31 detects a read error, the magnetic head 27 is carried at the same carrying velocity as that when the read error is detected, and the carrying velocity of the magnetic head 27 is varied after the magnetic read operation is performed once. However, the carrying velocity of the magnetic head 27 can be varied immediately after the read error is detected.

Furthermore, the magnetic read of information stored in the magnetic stripe 12a of the magnetic card 12 of the magnetic read control apparatus 11 is performed by stopping the magnetic card 12 in a given position of the carrying path 14 and moving the magnetic head 27. The present invention is not limited to this. The magnetic read can be done by fixing the magnetic head 27 and carrying the magnetic card 12 or by carrying the magnetic card 12 and moving the magnetic head 27. In other words, a relative velocity between the carrying velocity of the magnetic head 27 and that of the magnetic card 12 can be varied when magnetic information is read.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A magnetic read control apparatus comprising:
    a medium carrying section configured to carry an inserted medium having a magnetic stripe;
    a magnetic head carrying section configured to carry a magnetic head in a predetermined direction;
    a reading section configured to read information stored in the magnetic stripe with the magnetic head;
    a control section configured to control the reading section so as to read the information stored in the magnetic stripe by varying a relative carrying velocity between a velocity at which the medium carrying section carries the medium and a velocity at which the magnetic head carrying section carries the magnetic head when a read error occurs in the reading section, and
    a level determining section configured to determine a level at which a waveform of the information read by the reading section is reproduced,
    wherein the control section: (i) increases the relative carrying velocity to be higher than a carrying velocity for a read error when the read error occurs in the reading section when the level determined by the level determining section is lower than a preset level, and (ii) decreases the relative carrying velocity to be lower than a carrying velocity for a read error when the read error occurs in the reading section when the level determined by the level determining section is higher than the preset level.

2. The magnetic read control apparatus according to claim 1, further comprising a storage section for storing the relative carrying velocity when the reading section reads the information stored in the magnetic stripe, wherein the control section controls carriage of the medium by the medium carrying section and carriage of the magnetic head by the magnetic head carrying section based on the relative carrying velocity stored in the storage section.

3. A magnetic read control apparatus comprising:

a medium carrying section configured to carry an inserted medium having a magnetic stripe;

a magnetic head carrying section configured to carry a magnetic head in a predetermined direction;

a reading section configured to read information stored in the magnetic stripe with the magnetic head;

a control section configured to control the reading section so as to read the information stored in the magnetic stripe by varying a relative carrying velocity between a velocity at which the medium carrying section carries the medium and a velocity at which the magnetic head carrying section carries the magnetic head when a read error occurs in the reading section; and a level determining section configured to determine a level at which a waveform of the information read by the reading section is reproduced, wherein, when a read error occurs, the control section performs (i) first control to increase the relative carrying velocity to be higher than a carrying velocity for the read error when the read error occurs in the reading section, and second control to increase the relative carrying velocity to be higher than a carrying velocity for the read error when the read error occurs in the reading section when the level determined by the level determining section is lower than a preset level, and to decrease the relative carrying velocity to be lower than a relative carrying velocity when the read error occurs in the reading section when the level determined by the level determining section is higher than the preset level, and wherein the magnetic read control apparatus includes a setting section for selecting one of the first control and the second control and for causing the control section to perform the one of the first control and the second control.

4. A magnetic read control apparatus comprising:

a medium carrying section configured to carry an inserted medium having a magnetic stripe;

a magnetic head carrying section configured to carry a magnetic head in a predetermined direction;

a reading section configured to read information stored in the magnetic stripe the magnetic head, and a control section which controls the reading section so as to read the information stored in the magnetic stripe without varying a relative carrying velocity between a carrying velocity of the medium by the medium carrying section and a carrying velocity of the magnetic head by the magnetic head carrying section at least one time when a read error occurs in the reading section, and then (ii) read the information stored in the magnetic stripe by varying the relative carrying velocity when additional read errors occur in the reading section.

5. The magnetic read control apparatus according to claim 4, wherein the control section varies the relative carrying velocity by increasing the relative carrying velocity to be higher than the carrying velocity for one of the additional read errors.

6. The magnetic read control apparatus according to claim 4, further comprising a level determining section configured to determine a level at which a waveform of the information read by the reading section is reproduced, wherein the control section: (i) increases the relative carrying velocity to be higher than a carrying velocity for one of the additional read errors when the read error occurs in the reading section when the level determined by the level determining section is lower than a preset level, and (ii) decreases the relative carrying velocity to be lower than a carrying velocity for one of the additional read errors when the read error occurs in the reading section when the level determined by the level determining section is higher than the preset level.

7. The magnetic read control apparatus according to claim 5, further comprising a storage section for storing the relative carrying velocity when the reading section reads the information stored in the magnetic stripe, wherein the control section controls carriage of the medium by the medium carrying section and carriage of the magnetic head by the magnetic head carrying section based on the relative carrying velocity stored in the storage section.

8. The magnetic read control apparatus according to claim 6, further comprising a storage section for storing the relative carrying velocity when the reading section reads the information stored in the magnetic stripe, wherein the control section controls carriage of the medium by the medium carrying section and carriage of the magnetic head by the magnetic head carrying section based on the relative carrying velocity stored in the storage section.

9. The magnetic read control apparatus according to claim 4, further comprising a level determining section configured to determine a level at which a waveform of the information read by the reading section is reproduced, wherein the control section performs (i) first control to increase the relative carrying velocity to be higher than a carrying velocity for one of the additional read errors. and (ii) second control to increase the relative carrying velocity to be higher than a carrying velocity for one of the additional read errors when the read error occurs in the reading section when the level determined by the level determining section is lower than a preset level, and to decrease the relative carrying velocity to be lower than a carrying velocity for one of the additional read errors when the level determined by the level determining section is higher than the preset level, wherein the magnetic read control apparatus includes a setting section for selecting one of the first control and the second control and for causing the control section to perform the one of the first control and the second control.

* * * * *